Patented Feb. 11, 1941

2,231,729

UNITED STATES PATENT OFFICE

2,231,729

CELLULOSE ORGANIC ACID ESTER COMPOSITIONS CONTAINING GLYCOL DILACTATES

Lester W. A. Meyer, Kingsport, Tenn., assignor to Eastman Kodak Company, Rochester, N. Y., a corporation of New Jersey No Drawing. Application October 12, 1939
Serial No. 299,146

7 Claims. (Cl. 106—40)

This invention relates to compositions of matter in which cellulose organic acid esters, such, for instance, as cellulose acetate, cellulose acetate-propionate, cellulose acetate-butyrate, cellulose propionate, cellulose butyrate, and the like, are combined or mixed with a plasticizer, with or without a common solvent for both, and with or without other useful addition agents, so that the resulting product will have properties such as will make the composition highly advantageous for use in the plastic and analogous arts, such, for instance, as the manufacture of wrapping sheets or tissue, photographic film, molding compounds and products, artificial silk, varnishes or lacquers, coating compositions and the like.

One object of this invention is to produce compositions of matter which may be made into permanently transparent, strong and flexible sheets or films of desired thinness which are substantially waterproof, are unaffected by ordinary photographic fluids and possess the desired properties of a support for sensitive photographic coatings. Another object of my invention is to produce compositions of matter which are capable of easy and convenient manipulation in the plastic and analogous arts, such as in the manufacture of sheets, film, artificial silk filaments, varnishes, lacquers and the like, and to produce compositions which will not injure, or be injured by, the substances or surfaces with which they are associated during manufacture. Another object of my invention is to produce compositions which can be molded at elevated temperatures and high pressures to produce plastic products having the desirable properties of hardness, toughness and elasticity.

I have discovered that valuable properties may be induced in and/or contributed to compositions containing cellulose organic acid esters, such as cellulose acetate, cellulose acetate-propionate, cellulose acetate-butyrate, and the like, by adding thereto, as a plasticizing compound, a dilactate of a glycol containing from 3 to 6 carbon atoms, such, for instance, as trimethylene glycol dilactate, propylene glycol dilactate, diethylene glycol dilactate, or triethylene glycol dilactate. The particularly useful properties which these compounds induce in or contribute to cellulose ester compositions containing them are hereinafter enumerated. I give, below, several examples of the method of preparing these compounds.

EXAMPLE I.—*Trimethylene glycol dilactate.*—456 grams of trimethylene glycol, 1482 grams of 85% lactic acid, 10 cc. of concentrated sulfuric acid, and 300 cc. of toluene were placed in a 3-necked flask fitted with a stirrer, a thermometer and a reflux condenser with means for withdrawing water and returning toluene distilled over, in a manner well known to those skilled in carrying out esterifications. The materials were stirred and refluxed until 450 grams of water had been removed. The material remaining in the reaction vessel was washed with sodium carbonate solution, then with water containing some sodium chloride to facilitate separation. It was then dried over anhydrous calcium chloride. The toluene was distilled off under reduced pressure. The product was also distilled under reduced pressure. It was a yellowish, viscous liquid.

EXAMPLE II.—*Propylene glycol dilactate.*—1672 grams of propylene glycol, 5320 grams of 85% lactic acid, 5 grams of p-toluene sulfonic acid, and 750 cc. of toluene were placed in a 12-liter, 3-necked flask fitted with a thermometer, a stirrer, and a reflux condenser with means for withdrawing water and returning toluene distilled over. The mixture was stirred and refluxed until 1490 cc. of water had been withdrawn. The p-toluene sulfonic acid was neutralized by the addition of 3.2 grams of sodium carbonate. The toluene was distilled off under reduced pressure, and the product distilled under reduced pressure. It had a boiling range of 130–140° C. at 1 mm. Hg. pressure; sp. gr. at 20° C., 1,183; was viscous at −60° C., and was insoluble in water.

EXAMPLE III.—*Diethylene glycol dilactate.*—1061 grams of diethylene glycol, 2332 grams of 85% lactic acid, 5 grams of p-toluene sulfonic acid, and 500 cc. of toluene were placed in a 3-necked flask fitted with a thermometer, a stirrer, and a reflux condenser with means for withdrawing water and returning toluene distilled over. The materials were stirred and refluxed until no more water came over. 1.54 grams of sodium carbonate was then added to neutralize the p-toluene sulfonic acid. The toluene was distilled off under reduced pressure, and the product distilled under reduced pressure. It boiled at 135–145° C. at 1 mm. Hg. pressure. After being recrystallized from alcohol, the product was in the form of pure white, cubic crystals, m. p. 121° C.

EXAMPLE IV.—*Triethylene glycol dilactate.*—1275 grams of triethylene glycol, 1980 grams of 85% lactic acid, 5 grams of p-toluene sulfonic acid, and 600 cc. of toluene were placed in a 5-liter, 3-necked flask fitted with a thermometer, a stirrer, and a reflux condenser with means for withdrawing water and returning toluene distilled over. The materials were stirred and refluxed until no more water came over. The toluene was distilled off under reduced pressure, and the product distilled under reduced pressure. The product distilled at 155–160° C. at 0.3 mm. Hg. pressure. It was slightly yellow-green in color, and contained a considerable amount of triethylene glycol monolactate, which did not impair its usefulness as a plasticizer.

In order that those skilled in this art may better understand my invention I would state, by way of illustration, that for the manufacture of photographic film base or other sheets my new compositions of matter may be compounded as follows: 100 parts of acetone-soluble cellulose acetate, i. e., cellulose acetate containing from about 36% to 42% acetyl radical, is dissolved with stirring at atmospheric temperature in 300 to 500 parts, preferably 400 parts, by weight, of acetone. To this solution may be added from 10 to 50 parts by weight of any of my novel plasticizers. Within the limits stated, the amount of plasticizer may be decreased or increased, depending upon whether it is desired to decrease or increase, respectively, the properties which these plasticizers contribute to the finished product. The amount of volatile solvent employed may also be increased or decreased, depending upon whether it is desired to have a more or less freely flowing composition, respectively.

A composition of matter prepared as above described may be deposited upon any suitable film-forming surface and the acetone evaporated therefrom to form a film or sheet, in a manner well known to those skilled in the art. A film so produced has permanently brilliant transparency and low inflammability, burning no more readily than ordinary newsprint. Films or sheets produced in accordance with my invention are very tough and flexible, and maintain flexibility in a superior fashion.

Other volatile solvents which are compatible with the cellulose acetate and my new plasticizers will also occur to those skilled in this art, such as ethylene chloride-alcohol mixtures. In like manner these plasticizers may be compounded with other single organic acid esters of cellulose, such as cellulose propionate, butyrate, stearate and the like, or with mixed organic acid esters, such as cellulose acetate-stearate, cellulose acetate-propionate, cellulose acetate-butyrate, cellulose acetate-lactate, cellulose acetate-tartrate or the like, a suitable solvent which will dissolve both the cellulose ester and the plasticizer being employed, such, for instance, as an alkylene chloride with or without the addition of alcohol. For instance, cellulose acetate-propionate and any of my new plasticizers may be dissolved in ethylene chloride or in a mixture of propylene chloride and methanol, and sheets of excellent flexibility may be deposited from these solutions. Other substances, such as fire-retardents, evaporation-retardents, etc., may be added to the film-forming compositions.

My novel plasticizers may also be advantageously used as plasticizers in cellulose organic acid ester molding compositions. For instance, about 25 to 100 parts of the plasticizer, depending on the hardness or softness of the plastic desired, may be homogeneously mixed with 100 parts of cellulose acetate, and the mixture converted into a transparent or translucent plastic product by molding at a temperature of 140–160° C. and a pressure of 2500 to 4000 pounds per square inch for a period of from 2 to 5 minutes, in a manner well known to those skilled in molding compounds of that nature. The softer plastics may be extruded through a die.

The dilactates of the glycols containing from 3 to 6 carbon atoms are solvents for cellulose acetate at room temperature. When 30 or more parts of any of these plasticizers is worked on hot rolls with 100 parts of cellulose acetate, in the absence of any other solvent, it completely gelatinizes the cellulose acetate after a short period of mixing, giving a completely homogenous plastic mass.

What I claim as my invention and desire to be secured by Letters Patent of the United States is:

1. A composition comprising a cellulose organic acid ester and, as a plasticizer therefor, a dilactate of a glycol containing from 3 to 6 carbon atoms.

2. A composition comprising a cellulose organic acid ester and, as a plasticizer therefor, a dilactate of a glycol containing 3 carbon atoms.

3. A composition comprising a cellulose organic acid ester and, as a plasticizer therefor, diethylene glycol dilactate.

4. A composition comprising a cellulose organic acid ester and, as a plasticizer therefor, triethylene glycol dilactate.

5. A transparent, flexible sheet comprising a cellulose organic acid ester and, as a plasticizer therefor, a dilactate of a glycol containing from 3 to 6 carbon atoms.

6. A molding composition adapted for molding under elevated temperatures and high pressures, comprising a cellulose organic acid ester and, as a plasticizer therefor, a dilactate of a glycol containing from 3 to 6 carbon atoms.

7. A composition comprising 100 parts of a cellulose organic acid ester and, as a plasticizer therefor, from 5 to 100 parts, approximately, of a dilactate of a glycol containing from 3 to 6 carbon atoms.

LESTER W. A. MEYER.